Patented Sept. 21, 1943

2,329,730

UNITED STATES PATENT OFFICE 2,329,730

PRODUCTION OF CELLULOSE ESTERS

George W. Seymour and Blanche B. White, Cumberland, Md., assignors to Celanese Corporation of America, a corporation of Delaware No Drawing. Application April 9, 1941, Serial No. 387,606

37 Claims. (Cl. 260—230)

This invention relates to improvements in the production of cellulose esters, and is more particularly concerned with the production of cellulose acetate or other cellulose esters, particularly lower fatty acid esters of cellulose.

This application is a continuation-in-part of U. S. application S. No. 328,808, filed April 10, 1940, which is in turn a continuation in part of U. S. applications S. Nos. 261,764, filed March 14, 1939, 264,127, filed March 25, 1939, and 277,026 filed June 2, 1939.

In the manufacture of cellulose acetate, the cellulose, with or without a pretreatment with organic acids or organic acids containing a little sulphuric acid, is customarily acetylated with a medium containing acetic anhydride, acetic acid and sulphuric acid, e. g., in a proportion of some 9–15% on the weight of the cellulose. Some of this sulphuric acid may have been introduced in a pretreatment designed to make the cellulose more reactive. When the acetylation is complete, water is stired into the mixture, and the whole allowed to stand until a sample shows that the desired acetone-solubility has been reached. During this standing period, or ripening period as it is usually called, not only are acetyl groups split off, but in addition combined sulphuric acid is split off. With a view to obtaining cellulose acetates of a sufficiently high viscosity for the production of filaments and for the production of strong films and sheets, the customary commercial practice is not to allow the temperature during the acetylation to rise above a certain value, for example about 35° C., and also to conduct the ripening at substantially atmospheric temperature, for example at a temperature of 22–23° C. In this way, cellulose acetates having a viscosity of 10–20 or more may be produced, these units being a measure of the rate of flow of a 6% solution of cellulose acetate in acetone, taking the rate of flow of glycerine as 100. Generally if the temperature during the acetylation is allowed to go up say to 50° C. or 60° C., as in the early Miles process for producing an acetone-soluble cellulose acetate, or if the mixture is heated during ripening, a low viscosity cellulose acetate results, suitable, for example, for lacquer purposes. When the desired acetyl value has been reached in the ripening operation, the cellulose acetate is precipitated and washed, and is then subjected to a stabilizing treatment, usually by heating it in suspension in a very dilute sulphuric acid with the object of still further reducing its content of combined sulphuric acid.

In the production of the cellulose acetate for the purpose of forming filaments, films and sheets as described above, the acetylation itself may take some 4–8 hours and the ripening from 20 to 45 or 50 hours. One of the objects of the present invention is to reduce substantially the total period of acetylation and ripening while still obtaining a cellulose acetate suitable for the manufacture of filaments and strong films, sheets and the like both from the point of view of the viscosity and clarity of the cellulose acetate. Further, it is possible by means of the present invention to obtain as a result of the ripening operation cellulose acetates having a substantially reduced content of combined sulphuric acid.

It has been found that if, after an acetylation as described above, the sulphuric acid content of the acetylation medium is adjusted to a certain range of values, the ripening may be conducted at elevated temperatures without producing serious degradation of the cellulose, so that the acetone-soluble product still has a sufficiently high viscosity and clarity to produce good filaments and strong clear films and sheets. Further, it has been found that with this range of values of sulphuric acid content, even if the ripening is effected at temperatures which are only slightly above normal ripening temperatures, for example if it be conducted at temperatures of 30–40° C., substantial advantage accrues in that the product has a lower content than usual of combined sulphuric acid at the end of the ripening treatment. This range of values of sulphuric acid is somewhat lower than the most advantageous proportions of sulphuric acid for use in the acetylation itself, and consequently there may be added at the beginning of the ripening treatment, either before or after the water or together with the water for ripening, a proportion of magnesium acetate, magnesium carbonate or the like such that the sulphuric acid content is adjusted to the desired value.

The most advantageous range of values for ripening at temperatures up to 65° C. is about 4–8 or 9% of free sulphuric acid based on the weight of the cellulose used as starting material. With higher temperatures, for example 70–90° C., still lower values for the free sulphuric acid may be used, for example down to 2%. If the acetylation is conducted with some 10 or 12–15% of sulphuric acid based on the cellulose, and if the ripening is to be conducted at about 50–60° C., it is most advantageous to add sufficient magnesium acetate or carbonate to neutralize about one-third to two-thirds of the sulphuric acid present. For the purposes of this specification it is convenient to consider that the magnesium acetate or the like so added is wholly converted to magnesium sulphate $MgSO_4$, and the sulphuric acid present over and above the amount so combined with the magnesium is referred to as free sulphuric acid.

As has been indicated above, by the use during ripening of the range of values for free sulphuric acid content referred to, the cellulose acetates produced by the ripening treatment have a reduced content of combined sulphuric acid. This content of combined sulphuric acid may be so low that stabilization is unnecessary, but the necessity or otherwise for stabilization depends inter alia upon the temperature used for the ripening and upon the amount of water added for ripening. Moreover, the amount of water to be added to the ripening bath for ripening purposes depends, in general, upon the content of free acid in the ripening bath as well as upon the temperature used for ripening. For example, when the ripening is conducted with an amount of sulphuric acid equal to from 4 to 8% of the weight of the cellulose originally employed at a temperature of about 35° C., the amount of water used for ripening may advantageously be from 6 to 20%, and preferably 18 to 19%, based on the weight of the original cellulose. When conducting the ripening with an amount of sulphuric acid equal to 9% of the weight of the original cellulose at a temperature of about 30° C. the amount of water used for ripening should not exceed about 25% of the original weight of the cellulose. With an amount of free sulphuric acid of about 5% at the same temperature, the amount of water used should not exceed about 30% of the original weight of the cellulose. In all cases in this specification the amounts of water used for ripening exclude the amount of water necessarily added for the purpose of destroying or killing the acetic anhydride left over at the end of the acetylation. When using higher temperatures for ripening, larger amounts of water may be employed. For example, with about 5% free sulphuric acid in the ripening bath at a temperature of 40° C., the amount of water used for ripening may reach 40%, while still higher values may be used with increasing temperature, for example an amount up to 50% at 60° C.

With a view to producing, as a result of the ripening treatment, cellulose acetates of very low sulphuric acid content, the water for ripening may be added in two stages, that added at the first stage being allowed to act for some time, for example 2–4 hours or more, and the water then added for the second stage ripening. When ripening is conducted by this method, quite large amounts of water based on the original cellulose may be added. For example, with a free sulphuric acid content of about 5% on the original weight of the cellulose, and when conducting the ripening at say 60° C., an amount of water based on the original cotton of 50% may be added in the first stage, and the ripening continued for some 4 hours, and then a further quantity of water equal to as much as 100% or more of the original weight of the cotton may be added and this allowed to act until the desired acetyl value is produced.

The water for ripening may, where suitable, be added as such or may be added in the form of a dilute solution of acetic acid, it being merely necessary to have it stirred in without producing any substantial precipitation of the cellulose acetate. The magnesium acetate, carbonate or the like may be added together with the water for ripening, particularly if this is added in the form of a dilute solution of acetic acid, or it may be added separately, e. g., in solution in glacial acetic acid. Other neutralizing agents may be used, though it is found that magnesium compounds are best. Other neutralizing agents include calcium acetate or carbonate and zinc acetate or zinc oxide. Alkali metal compounds do not give good results.

Since the ripening treatment according to the present invention results in the cellulose acetates having a lower content than usual of combined sulphuric acid at the end of the ripening treatment, the invention is eminently suitable for the production of cellulose acetates of high acetyl content, particularly acetyl contents of 56–57% or more, calculated as acetic acid. Such acetates have been difficult to prepare according to the known methods of the art because when ripening is conducted normally, when the acetyl value has fallen to a value of 57% or even 56%, the sulphuric acid content is still too high for satisfactory precipitation and subsequent stabilization. By a careful adjustment of the amount of free sulphuric acid, amount of water added for ripening and temperature of ripening, it is even possible to produce by the present invention cellulose acetates of high acetyl content which have such a low content of combined sulphuric acid that they do not require stabilization.

The water for ripening and the magnesium acetate, carbonate or the like, are thoroughly mixed with the acetylation solution at the end of the acetylation, for example in a Werner-Pfleiderer. If desired, the agitation by means of the Werner-Pfleiderer or other mixing apparatus may be continued throughout the ripening treatment, particularly if the ripening treatment is conducted at high temperatures, for example at 50–65° C., for short periods.

In working the present invention, the cellulose may, for example, be pretreated with acetic acid or formic acid, which may be present in a small amount, for example 20–50% on the weight of the cellulose, or in much larger quantities, for example 100%, 200% or even 300% on the weight of the cellulose, and which may contain a small quantity of sulphuric acid, for instance ½–1 or 2% on the weight of the cellulose. The pretreatment is preferably allowed to go on for some hours, for example over-night, though much shorter periods may be used when sulphuric acid is present, and the pretreated cellulose is then treated with acetic anhydride and sulphuric acid in the appropriate amount to bring about acetylation.

The temperature during the acetylation is preferably maintained at a fairly low figure, and for this purpose the acetic anhydride and any acetic acid mixed therewith may be pre-cooled before introduction of the cellulose. However, peak temperatures of 35° C. or even as high as 40 or 45° C. may be used in the process of the present invention, since by combining such an acetylation process with the special ripening treatment of the present invention, good viscosities are still obtainable. After the acetylation is complete, the ripening is conducted as already described.

In operating the ripening treatment of the present invention at elevated temperatures, for example 50–65° C., the ripening time may be reduced from the high figure of 20-45 or 50 hours down to 5 hours, 3 hours, 2 hours or even less, depending on the particular temperature employed during the ripening and upon the amount of free sulphuric acid present during the ripening. In consequence the ripening may be conducted as a continuous process, the mixture being allowed to travel slowly through a suitable conduit maintained at the desired temperature and of such a length that the speed of passage of the mixture therethrough can be adjusted to give the required time of treatment. Such a conduit may be charged at one end in the acetylation room, and may discharge its contents directly into a precipitator.

The invention is particularly addressed to the acetylation of cellulose using sulphuric acid as catalyst. However, phosphoric acid may be used in a similar way, or mixtures of phosphoric acid and sulphuric acid, though the best results are obtained with sulphuric acid alone and without the radicles of any other mineral acids either during the acetylation or during the ripening. In a similar way, other cellulose esters may be prepared, for example the cellulose esters of propionic, butyric or similar acids, or mixed esters, for example cellulose acetate-propionate, acetate-butyrate and the like.

The following examples illustrate the invention but do not limit it in any way.

Example I 100 parts of cotton are acetylated with a mixture comprising 375 parts of acetic acid, 215 parts of acetic anhydride and 14 parts of sulphuric acid, the peak temperature being of the order of 35–40° C. There is then stirred into the mixture an amount of water sufficient to destroy the excess acetic anhydride, and in addition an amount equal to 30% of the original weight of the cotton, together with sufficient magnesium carbonate to combine with 9 parts of the sulphuric acid present. The ripening is then effected without agitation at 30° C. until the desired acetyl value is reached. For example, for an acetyl value of about 54.5%, this may take some 50 hours. The resulting cellulose acetate, which is then precipitated and washed, has a high viscosity of the order of 50–60 on the scale mentioned above, good clarity and a low content of combined sulphuric acid.

Example II

This example illustrates the use of a lower quantity of water and a longer period of ripening to obtain a product of medium viscosity. Acetylation is carried out as in Example I and water and magnesium carbonate added. The amount of magnesium carbonate is the same as in Example I, but the amount of water for ripening is 25% on the original weight of the cotton. Ripening is conducted at 30° C. for about 65 hours. The product has a medium viscosity, a good clarity and a still lower content of combined sulphuric acid.

Example III

Acetylation is carried out as in Example I and magnesium carbonate and water added for ripening. The amount of magnesium carbonate is such as to leave 2% of free sulphuric acid, and the amount of water for ripening is 48% on the weight of the cotton. Ripening is conducted at 60° C. with agitation for about 5½–7½ hours. Again a cellulose acetate is obtained of high viscosity (of the same order as in Example I), of good clarity, of lower sulphuric acid content, and of high acetyl value (56–57%).

Example IV

A quicker ripening may be effected by neutralizing all but 4% of the sulphuric acid. Otherwise the conditions are as stated in Example III. The time of ripening in this case is reduced to the order of 3½ hours to obtain a product of acetyl value 56–57%.

Example V 100 parts of cotton are acetylated with an acetylating mixture comprising 371 parts of acetic acid, 206 parts of acetic anhydride and 14.7 parts of $H_2SO_4$ for a period of 1.5 hours, during which, a peak temperature of 42° C. is allowed to occur. There is then added just sufficient water to react with any residual acetic anhydride in order to convert the same to acetic acid. The ripening is effected by adding to the acetylation mixture with stirring sufficient magnesium carbonate to neutralize all but 5.7 parts of the sulphuric acid (9.1 parts of magnesium carbonate analyzing 40.7% MgO) and 18.2 parts of water, and stirring the mixture.

Example VI

Acetylation is conducted as in Example I and the water for ripening is 48% on the weight of the cotton and the magnesium carbonate is such as to leave 6% free sulphuric acid. Ripening is conducted at 50° C. and after about 6 hours a product of 53–54% acetyl value is produced of low combined sulphuric acid content, good clarity and medium viscosity.

By neutralizing all but 4% of the free sulphuric acid and conducting the ripening at 60° C., the ripening time may be reduced to about 4 hours, while the same ripening time may be used if the free sulphuric acid is reduced to 2% and the ripening temperature raised to 70° C. In this last case a product of very low combined sulphuric acid content is obtained.

Example VII 170 parts of cotton are acetylated with 630 parts of acetic acid, 358 parts of acetic anhydride and 23.5 parts of sulphuric acid, the parts being by weight. The time of acetylation is 1.5 hours during which the mixture is allowed to attain a peak temperature of 42° C. Water is then added in amount only sufficient to react with any free acetic anhydride.

Next there is added to the acetylation mixture an amount of magnesium carbonate sufficient to adjust the sulphuric acid content to an amount equal to about 5% of the weight of the cellulose employed as the starting material. There is then added water in amount equal to 48–50% of the weight of the cellulose used, in order to bring about ripening. The mass is agitated in a jacketed Werner-Pfleiderer machine where its temperature is maintained at 60° C. After 2 hours of this treatment, the cellulose acetate is precipitated by the addition of a large amount of water, and is then washed and dried. The cellulose acetate has an acetyl value of 58–59%, calculated as acetic acid, and is quite soluble in acetone. If the time of ripening is extended to 6 hours, an acetone-soluble cellulose acetate of 54–55% acetyl value is produced.

The resulting cellulose acetate is of high viscosity. If the same conditions are employed with the exception that the quantity of water added for ripening is decreased to about 36% of the weight of the cellulose employed as starting material, the cellulose acetate produced is of lower viscosity.

Example VIII 170 parts of cotton linters are acetylated with an acetylation solution containing about 600 parts of acetic acid, 400 parts of acetic anhydride and 18 parts of sulphuric acid, all by weight. The time of acetylation is about 1½ hours during which time the temperature is not allowed to exceed about 40° C. On completion of acetylation, water is added in an amount just sufficient to destroy the excess of acetic anhydride and part of the sulphuric acid is neutralized by the addition of about 6 parts by weight of magnesium carbonate so as to reduce the sulphuric acid content to about 7% on the weight of the cellulose employed. 110 parts by weight of water are also introduced. The mixture is then well stirred in a jacketed Werner-Pfleiderer machine, its temperature being maintained at about 60° C. After about 3-5 hours treatment, a 35% aqueous solution of acetic acid containing about 240 parts by weight of water is added and the mixture is again stirred for about 1-2 hours at 60° C. The ripened cellulose acetate is then precipitated by the addition of a large quantity of water, after which it is washed and dried. It has an acetyl value of about 54 or 55% and is soluble in acetone. The ripening operation may be continued for a longer time if a product having a lower acetyl content is required. For example, by continuing the operation for about 1-2 hours longer, a product having an acetyl content of about 53-54% may be obtained.

It is to be understood that the foregoing detailed description is given merely by way of illustration and that many variations may be made therein without departing from the spirit of our invention.

Having described our invention, what we desire to secure by Letters Patent is:

1. Process for the production of cellulose acetates, which comprises acetylating cellulose with acetic anhydride in a medium containing acetic acid as solvent and 10-15% on the weight of the cellulose of sulphuric acid as catalyst, neutralizing part of the sulphuric acid at the completion of the acetylation by means of a magnesium compound so as to leave less than 8% of free sulphuric acid, and effecting ripening.

2. Process for the production of cellulose acetates, which comprises acetylating cellulose with acetic anhydride in a medium containing acetic acid as solvent and 10-15% on the weight of the cellulose of sulphuric acid as catalyst, neutralizing part of the sulphuric acid at the completion of the acetylation by means of a magnesium salt of a weak acid so as to leave less than 8% of free sulphuric acid, and effecting ripening.

3. Process for the production of cellulose acetates, which comprises acetylating cellulose by means of acetic anhydride in a medium containing acetic acid as solvent and 10-15% on the weight of the cellulose of sulphuric acid as catalyst, neutralizing part of the sulphuric acid by means of a magnesium compound so as to leave 4-8% of free sulphuric acid, and effecting ripening at 50-65° C. by means of water.

4. Process for the production of cellulose acetates, which comprises acetylating cellulose by means of acetic anhydride in a medium containing acetic acid as solvent and 10-15% on the weight of the cellulose of sulphuric acid as catalyst, neutralizing part of the sulphuric acid by means of a magnesium compound so as to leave 4-8% of free sulphuric acid, and effecting ripening by means of water while agitating the mixture.

5. Process according to claim 4, wherein ripening is effected at above 50° C.

6. Process for the production of cellulose acetates, which comprises acetylating cellulose by means of acetic anhydride in a medium containing acetic acid as solvent and 10-15% on the weight of the cellulose of sulphuric acid as catalyst, neutralizing part of the sulphuric acid by means of a magnesium compound so as to leave 4-8% of free sulphuric acid, and effecting ripening of the cellulose acetate by means of water, and precipitating the cellulose acetate when it has become acetone-soluble and still has an acetyl content, calculated as acetic acid, of more than 56%.

7. Process for the production of cellulose acetates, which comprises acetylating cellulose by means of acetic anhydride in a medium containing acetic acid as solvent and 10-15% on the weight of the cellulose of sulphuric acid as catalyst, neutralizing part of the sulphuric acid by means of a magnesium compound so as to leave less than 8% of free sulphuric acid, and adding water, allowing to ripen for some time, and then adding more water and continuing the ripening.

8. Process for the production of cellulose acetates, which comprises acetylating cellulose by means of acetic anhydride in a medium containing acetic acid as solvent and 10-15% on the weight of the cellulose of sulphuric acid as catalyst, neutralizing part of the sulphuric acid by means of a magnesium compound so as to leave less than 8% of free sulphuric acid, and adding water, allowing to stand until some ripening has occurred, and then adding more water and continuing the ripening, the mixture being agitated throughout the ripening treatment.

9. Process according to claim 8, wherein the ripening is effected at above 50° C.

10. Process for the production of cellulose acetate, which comprises acetylating cellulose with acetic acid anhydride in acetic acid as solvent for the cellulose acetate produced, employing from 8 to 15%, based on the weight of the cellulose employed as starting material, of sulphuric acid as catalyst, adjusting the amount of free sulphuric acid present in the primary solution to 4-9% based on the weight of cellulose employed as starting material by means of a compound selected from the group consisting of magnesium and zinc compounds, adding an amount of water sufficient to convert any acetic acid anhydride present in the primary solution to acetic acid and an additional amount of water equal to from 15-40% based on the original weight of the cellulose, and permitting the solution to hydrolyze or ripen at a temperature of 40-65° C. until cellulose acetate of the desired characteristics is obtained.

11. Process for the production of cellulose acetate, which comprises acetylating cellulose with acetic acid anhydride in acetic acid as solvent for the cellulose acetate produced, employing from 8 to 15%, based on the weight of the cellulose employed as starting material, of sulphuric acid as catalyst, adding magnesium acetate to the primary solution to reduce the amount of free sulphuric acid present in the primary solution to 4-9% based on the weight of cellulose employed as starting material and an amount of water sufficient to convert any acetic acid anhydride present in the primary solution to acetic acid, adding an additional amount of water equal to from 15-40% based on the original weight of the cellulose, and permitting the solution to hydrolyze or ripen at a temperature of 40-65° C. until cellulose acetate of the desired characteristics is obtained.

12. Process for the production of cellulose acetate, which comprises acetylating cellulose with acetic acid anhydride in acetic acid as solvent for the cellulose acetate produced employing 12-15%, based on the weight of the cellulose employed as starting material, of sulphuric acid as catalyst, adding to the primary solution magnesium acetate in an amount sufficient to neutralize substantially half of the sulphuric acid present in said primary solution, adding an amount of water sufficient to convert any acetic acid anhydride present in the primary solution to acetic acid and an additional amount of water equal to from 20-30% based on the original weight of the cellulose, permitting the solution to hydrolyze or ripen at a temperature of 50-60° C. for at most five hours, and then precipitating the ripened cellulose acetate.

13. A method for the production of cellulose esters of lower aliphatic acids, which comprises esterifying cellulose with an anhydride of a lower aliphatic acid in a solvent for the cellulose ester produced using sulphuric acid as catalyst, adjusting the sulphuric acid present in the primary esterification solution to a concentration of approximately 4 to 8%, based on the weight of the cellulose originally present, by means of a compound selected from the group consisting of magnesium and zinc compounds, incorporating water with the esterification solution and ripening the ester at a temperature between 50 and 90° C. with agitation, further water being incorporated during ripening in an amount sufficient to bring the concentration of the sulphuric acid in water below that existing at the beginning of the ripening operation.

14. A method for the production of cellulose acetate, which comprises acetylating cellulose with acetic anhydride in acetic acid as solvent for the cellulose acetate using sulphuric acid as catalyst, adjusting the sulphuric acid present in the primary acetylation solution to a concentration of approximately 4 to 8%, based on the weight of the cellulose originally present, by means of a compound selected from the group consisting of magnesium and zinc compounds, incorporating water with the acetylation solution and ripening the cellulose acetate at a temperature between 50 and 90° C. with agitation, further water being incorporated during ripening in an amount sufficient to bring the concentration of the sulphuric acid in water below that existing at the beginning of the ripening operation.

15. A method for the production of cellulose acetate, which comprises acetylating cellulose with acetic anhydride in acetic acid as solvent for the cellulose acetate using sulphuric acid as catalyst, adjusting the sulphuric acid present in the primary acetylation solution to a concentration of approximately 4 to 8%, based on the weight of the cellulose originally present, by means of a compound selected from the group consisting of magnesium and zinc compounds, incorporating water with the acetylation solution and ripening the cellulose acetate at a temperature about 60° C. with agitation, further water being incorporated during ripening in an amount sufficient to bring the concentration of the sulphuric acid in water below that existing at the beginning of the ripening operation.

16. A method for the production of cellulose acetate, which comprises acetylating cellulose with acetic anhydride in acetic acid as solvent for the cellulose acetate using sulphuric acid as catalyst, adjusting the sulphuric acid present in the primary acetylation solution to a concentration of approximately 4 to 8%, based on the weight of the cellulose originally present, by means of a compound selected from the group consisting of magnesium and zinc compounds, incorporating water with the acetylation solution and ripening the cellulose acetate at a temperature between 50 and 90° C. with agitation, and after 3 to 5 hours from the beginning of the ripening incorporating further water in an amount sufficient to bring the concentration of the sulphuric acid in water below that existing at the beginning of the ripening operation.

17. A method for the production of cellulose acetate, which comprises acetylating cellulose with acetic anhydride in acetic acid as solvent for the cellulose acetate using sulphuric acid as catalyst, adjusting the sulphuric acid present in the primary acetylation solution to a concentration of approximately 4 to 8%, based on the weight of the cellulose originally present, by means of a compound selected from the group consisting of magnesium and zinc compounds, incorporating water with the acetylation solution and ripening the cellulose acetate at a temperature about 60° C. with agitation, and after 3 to 5 hours from the beginning of the ripening incorporating further water in an amount sufficient to bring the concentration of the sulphuric acid in water below that existing at the beginning of the ripening operation.

18. Method of ripening or hydrolyzing lower fatty acid esters of cellulose, which comprises agitating a solution of a lower fatty acid ester of cellulose containing a proportion of hydrolyzing catalyst equivalent to 4 to 8% of sulphuric acid, based on the weight of the cellulose from which the cellulose ester has been derived, and a proportion of water sufficient to effect substantial hydrolysis of the cellulose ester but not exceeding 50%, based on the weight of such cellulose, at a temperature above 50° C. throughout the period of hydrolysis.

19. Method of ripening or hydrolyzing lower fatty acid esters of cellulose, which comprises agitating a solution of a lower fatty acid ester of cellulose containing substantially 5% of sulphuric acid, based on the weight of the cellulose from which the cellulose ester has been derived, and a proportion of water sufficient to effect substantial hydrolysis of the cellulose ester but not exceeding 50%, based on the weight of such cellulose, at a temperature of 50° to 90° C. throughout the period of hydrolysis.

20. Method of ripening or hydrolyzing cellulose acetate, which comprises agitating a solution of cellulose acetate containing substantially 5% of sulphuric acid, based on the weight of the cellulose from which the cellulose acetate has been derived, and a proportion of water sufficient to effect substantial hydrolysis of the cellulose ester but not exceeding 50%, based on the weight of such cellulose, at a temperature of 55° to 75° C. throughout the period of hydrolysis and precipitating the cellulose acetate when it has an acetyl value of 56 to 59%.

21. Process for the manufacture of lower fatty acid esters of cellulose, which comprises ripening or hydrolyzing the lower fatty acid ester of cellulose while in the primary solution in which it is formed and which contains magnesium sulphate, sulphuric acid in amount of 4 to 8 parts and water in amount of 6 to 20 parts, the parts being by weight per 100 parts by weight of cellulose used as the starting material.

22. Process for the manufacture of cellulose acetate, which comprises ripening or hydrolyzing cellulose acetate while in the primary solution in which it is formed and which contains magnesium sulphate, sulphuric acid in amount of 4 to 8 parts and water in amount of 6 to 20 parts, the parts being by weight per 100 parts by weight of cellulose used as the starting material.

23. Process for the manufacture of cellulose acetate, whicsh comprises ripening or hydrolyzing cellulose acetate while in the primary solution in which it is formed and which contains magnesium sulphate, sulphuric acid in amount of 4 to 8 parts and water in amount of 6 to 20 parts, the parts being by weight per 100 parts by weight of cellulose used as the starting material, and interrupting the ripening or hydrolysis before the acetyl value of the cellulose acetate falls below 57%.

24. Process for the manufacture of cellulose acetate, which comprises ripening or hydrolyzing cellulose acetate while in the primary solution in which it is formed and which contains magnesium sulphate, sulphuric acid in amount of 4 to 8 parts and water in amount of 18 to 19 parts, the parts being by weight per 100 parts by weight of cellulose used as the starting material.

25. Process for the production of cellulose acetate of high acetyl value, comprising ripening or hydrolyzing the cellulose acetate while in solution in acetic acid containing magnesium sulphate, sulphuric acid in amount of from 4 to 8% and water in amount of 6 to 20% of the cellulose used as starting material and interrupting the hydrolysis before the acetyl value of the cellulose acetate falls below 57%.

26. Process for the production of cellulose acetate of high acetyl value, comprising ripening or hydrolyzing the cellulose acetate while in solution in acetic acid containing magnesium sulphate, sulphuric acid in amount of 5% and water in amount of about 18–19% of the cellulose used as starting material.

27. Process for the production of cellulose acetate of high acetyl value, comprising ripening or hydrolyzing the cellulose acetate while in solution in acetic acid containing magnesium sulphate, sulphuric acid in amount of 5% and water in amount of about 18–19% of the cellulose used as starting material and interrupting the hydrolysis before the acetyl value of the cellulose acetate falls below 57%.

28. Process for the production of cellulose acetate of high acetyl value, comprising ripening or hydrolyzing the celulose acetate while in solution in acetic acid containing magnesium sulphate in amount of 8 to 13%, sulphuric acid in amount of 4 to 8% and water in amount of 6 to 20% of the cellulose used as starting material and interrupting the hydrolysis before the acetyl value of the cellulose acetate falls below 57%.

29. Process for the production of cellulose acetate of high acetyl value, comprising ripening or hydrolyzing the cellulose acetate while in solution in acetic acid containing magnesium sulphate in amount of 8 to 13%, sulphuric acid in amount of 5% and water in amount of about 18–19% of the cellulose used as starting material and interrupting the hydrolysis before the acetyl value of the cellulose acetate falls below 57%.

30. Process for the production of cellulose acetate, comprising acetylating cellulose with an acetylating mixture comprising acetic anhydride, acetic acid and sulphuric acid in amount from 9 to 15% of the weight of the cellulose, and then causing the same to ripen by the addition thereto of a magnesium compound adapted to neutralize the sulphuric acid under the conditions obtaining in restricted amount to leave 4 to 8% of free sulphuric acid and water in amount of 6 to 20% of the cellulose used as starting material.

31. Process for the production of cellulose acetate, comprising acetylating cellulose with an acetylating mixture comprising acetic anhydride, acetic acid and sulphuric acid in amount from 9 to 15% of the weight of the cellulose, and then causing the same to ripen by the addition thereto of a magnesium compound adapted to neutralize the sulphuric acid under the conditions obtaining in restricted amount to leave 5% of free sulphuric acid and water in amount of about 18–19% of the cellulose used as starting material.

32. Process for the production of cellulose acetate, comprising acetylating cellulose with an acetylating mixture comprising acetic anhydride, acetic acid and sulphuric acid in amount from 9 to 15% of the weight of the cellulose, and then causing the same to ripen by the addition thereto of a magnesium compound adapted to neutralize the sulphuric acid under the conditions obtaining in restricted amount to leave about 5% of free sulphuric acid and water in amount of about 18–19% of the cellulose used as starting material and interrupting the ripening before the acetyl value of the cellulose acetate falls below 57%.

33. Process for the production of ripened cellulose esters, which comprises esterifying cellulose by means of a lower fatty acid anhydride, using as esterification catalyst from 9 to 15% of a polybasic inorganic acid selected from the group consisting of sulphuric and phosphoric acids, thereafter neutralizing part of the catalyst by means of a compound selected from the group consisting of magnesium and zinc compounds, and ripening the cellulose ester in the bath produced which contains a smaller amount of the free polybasic inorganic acid catalyst.

34. Process for the production of ripened cellulose esters, which comprises esterifying cellulose by means of a lower fatty acid anhydride, using as esterification catalyst from 9 to 15% of sulphuric acid, thereafter neutralizing part of the catalyst by means of a compound selected from the group consisting of magnesium and zinc compounds, and ripening the cellulose ester in the bath produced which contains a smaller amount of the sulphuric acid catalyst.

35. Process for the production of cellulose acetates, which comprises acetylating cellulose by means of acetic anhydride, using as acetylation catalyst from 9 to 15% on the weight of the cellulose of sulphuric acid, so that the cellulose acetate is produced in solution, neutralizing part of the sulphuric acid at the completion of the acetylation by means of a compound selected from the group consisting of magnesium and zinc compounds, so as to leave less than 8% of free sulphuric acid, and effecting ripening in the bath so produced.

36. Process for the production of cellulose acetates, which comprises acetylating cellulose by means of acetic anhydride in presence of acetic acid as solvent, using as acetylation catalyst 10 to 15% on the weight of the cellulose of sulphuric acid, neutralizing part of the sulphuric acid at the completion of the acetylation by means of a compound selected from the group consisting of magnesium and zinc compounds, so as to leave less than 8% of free sulphuric acid, and effecting ripening in the bath so produced.

37. Process for the production of cellulose acetates, which comprises acetylating cellulose by means of acetic anhydride in presence of acetic acid as solvent, using as acetylation catalyst 10 to 15% on the weight of the cellulose of sulphuric acid, neutralizing part of the sulphuric acid at the completion of the acetylation by means of a compound selected from the group consisting of magnesium and zinc compounds, so as to leave 4 to 8% on the weight of the cellulose of free sulphuric acid, and effecting ripening in the bath so produced.

GEORGE W. SEYMOUR.
BLANCHE B. WHITE.